(12) United States Patent
Cochran

(10) Patent No.: US 6,363,124 B1
(45) Date of Patent: Mar. 26, 2002

(54) PHASE-NOISE COMPENSATED DIGITAL COMMUNICATION RECEIVER AND METHOD THEREFOR

(75) Inventor: Bruce A. Cochran, Mesa, AZ (US)

(73) Assignee: Sicom, Inc., Scottsdale, AZ (US)

( * ) Notice: Subject to any disclaimer, the term of this patent is extended or adjusted under 35 U.S.C. 154(b) by 0 days.

(21) Appl. No.: 09/680,877

(22) Filed: Oct. 6, 2000

Related U.S. Application Data

(62) Division of application No. 09/273,388, filed on Mar. 22, 1999, now Pat. No. 6,151,368.

(51) Int. Cl.[7] .............................................. H04L 27/06
(52) U.S. Cl. ........................ 375/326; 375/344; 329/307
(58) Field of Search ................................ 375/232, 233, 375/324, 326, 327, 344, 346, 348, 230, 231; 329/307, 308

(56) References Cited

U.S. PATENT DOCUMENTS

| | | | | |
|---|---|---|---|---|
| 3,727,134 A | | 4/1973 | Melvin ........................ 375/283 |
| 4,004,226 A | | 1/1977 | Qureshi ........................ 325/42 |
| 5,117,232 A | | 5/1992 | Cantwell ..................... 342/357 |
| 5,223,843 A | | 6/1993 | Hutchinson ................. 342/357 |
| 5,285,480 A | | 2/1994 | Chennakeshu .............. 375/101 |
| 5,315,619 A | * | 5/1994 | Bratt ........................... 375/340 |
| 5,471,508 A | * | 11/1995 | Koslov ........................ 375/344 |
| 5,497,400 A | | 3/1996 | Carson et al. .............. 375/324 |
| 5,604,769 A | | 2/1997 | Wang .......................... 375/229 |
| 5,671,253 A | | 9/1997 | Stewart ....................... 375/316 |
| 5,706,057 A | * | 1/1998 | Strolle et al. ................ 348/426 |
| 5,799,037 A | | 8/1998 | Strolle et al. ................ 375/233 |
| 5,835,532 A | * | 11/1998 | Strille et al. ................. 375/233 |
| 5,940,450 A | | 8/1999 | Koslov et al. ............... 375/344 |
| 5,943,363 A | | 8/1999 | Hanson et al. .............. 375/206 |
| 5,995,520 A | | 11/1999 | Uchiki et al. ............... 370/516 |
| 6,226,323 B1 | * | 5/2001 | Tan et al. .................... 375/233 |
| 6,266,380 B1 | * | 7/2001 | Wang .......................... 375/319 |

OTHER PUBLICATIONS

IEEE Transactions On Communications, vol. 37. No. 2, Feb. 1989, A New Pattern Jitter Free Frequency Error Detector; pp. 159–163.

* cited by examiner

*Primary Examiner*—Young T. Tse
(74) *Attorney, Agent, or Firm*—Lowell W. Gresham; Jordan M. Meschkow; Meschkow & Gresham, P.L.C.

(57) ABSTRACT

A phase-noise compensated digital communication receiver (40, 40', 40") includes a carrier tracking loop (56) which imposes a transport delay on a carrier tracking loop signal (60) before that signal (60) is fed back upon itself. The carrier tracking loop (56) includes a phase rotator (58) that rotates a down-converted digital communication signal (50) by a phase determined by a phase-conveying signal (72). A carrier tracking loop signal is obtained from the carrier tracking loop and delayed in a delay element (82) by a duration that compensates for the transport delay. A phase rotator (84) then rotates the delayed carrier tracking loop signal through a phase value determined by the phase-conveying signal (72) to obtain an open-loop phase signal (86) from which data are extracted. Different embodiments of the receiver (40, 40', 40") are provided to accommodate adaptive equalizer (54) issues.

17 Claims, 5 Drawing Sheets

PHASE-NOISE COMPENSATED DIGITAL COMMUNICATION RECEIVER AND METHOD THEREFOR

RELATED PATENTS

The present invention is a divisional of "Phase-Noise Compensated Digital Communication Receiver And Method Therefor," Ser. No. 09/273,388, filed Mar. 22, 1999, now U.S. Pat. No. 6,151,368, by Bruce A Cochran, which is incorporated herein by reference.

TECHNICAL FIELD OF THE INVENTION

This invention relates to digital communication systems. In particular, this invention relates to receivers used in digital communication systems and to adaptations in such receivers to reduce the unwanted effects of phase noise.

BACKGROUND OF THE INVENTION

In a digital communication system, the presence of noise can cause a receiver to make incorrect decisions about the data that a digital communication signal is conveying, resulting in a higher bit error rate (BER) than might be experienced in the presence of less noise. If the influence of noise can be reduced in a receiver, then BER improvements can result or other digital communication system parameters can be altered while maintaining an acceptable BER. Among others, such parameter alterations include transmission power level reductions, component cost reductions, and/or higher data rates.

Generally, two types of noise exert a significant influence in a digital communication receiver. The first type of noise is primarily additive because it affects the amplitudes of signals propagating in a communication system. Thermal noise, also known as Johnson noise or Nyquist noise, and interference primarily lead to additive noise. Additive noise is the subject of the signal-to-noise ratio parameter that is often used to characterize digital communication systems.

A second type of noise, called phase noise, is primarily temporal because it is characterized by fluctuations in the phase of various alternating signals used in a communication system. The majority of phase noise typically results from the use of oscillators to generate signals for up-conversion and down-conversion operations. As a general rule, much more phase noise results from the use of tunable oscillators than from the use of fixed frequency oscillators. However, tunable oscillators are often viewed as a practical necessity in communication systems that use frequency division multiplexing (FDM) and allow transmitters and receivers to tune to different frequency channels. Moreover, as a general rule less expensive oscillators generate more phase noise than more expensive oscillators.

FIG. 1 shows a simplified block diagram of a conventional digital communication receiver 10. Referring to FIG. 1, a received digital communication signal 12 is inevitably characterized by some amount of phase noise due to an up-conversion process at a transmitter (not shown) and some amount of additive noise due to thermal noise present in the transmitter and to various types of interference. Received signal 12 is down-converted in a mixer 14 using an oscillation signal provided by an oscillator 16. When oscillator 16 is frequency-tunable, as is often desirable in FDM communication systems, a significant amount of phase noise may be added to the already-present phase noise. Moreover, additive noise further accumulates due to the thermal noise associated with mixer 14 and other receiver front-end components that are omitted from FIG. 1. The down-converted signal is conventionally digitized at a block 18, possibly filtered through an optional adaptive equalizer 20, and passed to a conventional carrier tracking loop 22. The output of carrier tracking loop 22 drives a decoder 24 which extracts data from the received digital communication signal.

Carrier tracking loop 22 is a phase locked loop that includes a phase rotator 26 to receive the down-converted digital communication signal. A rotated signal portion of the carrier tracking loop signal from phase rotator 26 may be filtered through an optional adaptive equalizer 28, and a resulting equalized portion of the carrier tracking loop signal passed to a phase constellation error detector 30. Typically, either adaptive equalizer 20 or adaptive equalizer 28 is included in receiver 10, with adaptive equalizer 28 achieving better results in equalizing channel characteristics. A phase constellation error signal portion of the carrier tracking loop signal is passed from error detector 30 through a loop filter 32 to a phase integrator 34, which feeds a phase-conveying signal back to phase rotator 26.

In prior art digital communication receivers, such as receiver 10, reductions in the influence of phase noise lead to increases in the influence of additive noise, and vice-versa. Conventionally, the influences of additive and phase noises are balanced against one another in carrier tracking loop 22. A loop bandwidth parameter established primarily by loop filter 32, is set to desirably balance anticipated additive noise effects with anticipated phase noise effects. Generally, a narrower loop bandwidth is used to minimize the influence of additive noise, but narrowing the loop bandwidth impedes the carrier tracking loop's ability to track phase noise. A wider loop bandwidth is used to minimize the influence of phase noise, but widening the loop bandwidth increases out-of-band energy in the received signal and allows additive noise to assert a greater influence.

In some applications, conventional carrier tracking loop 22 risks complete failure. This occurs when signal-to-noise requirements in the down-converted digital communication signal dictate a bandwidth so narrow that phase noise cannot be tracked or when phase noise tracking requirements dictate a bandwidth so wide that the signal-to-noise ratio becomes too small to successfully extract communicated data. The conventional solution to this dilemma calls for any of a variety of component enhancements, which can dramatically increase the cost of receiver 10. For example, a high quality oscillator 16 which generates reduced phase noise can be used, but such a component may cost many times more than an alternate oscillator that generates more phase noise.

The phrase "modulation order" refers to the number of bits that are communicated in each unit interval of a digital communication signal. For example, QPSK has a modulation order of two and transmits two bits per unit interval, and sixteen-QAM has a modulation order of four and transmits four bits per unit interval. Modern digital communication systems achieve improved data rates through the use of higher modulation orders, such as a rate of four or more bits per unit interval. However, higher modulation orders typically require moderately high signal-to-noise ratios. A reduction in the influence of phase noise on a digital communication receiver would allow the balance between phase noise and additive noise achieved in the carrier tracking loop to favor higher signal-to-noise ratios and higher modulation order communication. Likewise, a reduction in the influence of phase noise on a digital communication receiver would result in a lowered BER. Or, it could allow the use of FDM operations and/or inexpensive components, particularly oscillators, while maintaining an acceptable BER.

SUMMARY OF THE INVENTION

Accordingly, it is an advantage of the present invention that an improved phase-noise compensated digital communication receiver and method are provided.

Another advantage is that the influence of phase noise is mitigated somewhat independently of the loop bandwidth characteristic of a carrier tracking loop.

Another advantage is that a digital communication receiver which can operate at higher modulation orders, such as four or more bits per unit interval, also tolerates a significant amount of phase noise.

The above and other advantages of the present invention are carried out in one form by a phase-noise-compensated receiver for digital communication which includes a carrier tracking loop, a delay element, and a phase rotator. The carrier tracking loop receives a down-converted digital communication signal and has a phase integrator which generates a phase-conveying signal. The delay element has an input coupled to the carrier tracking loop and has an output. The phase rotator resides outside the carrier tracking loop. It has a first input coupled to the delay element output, a second input coupled to the phase integrator and an output that provides a signal from which digital communication data are extracted.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
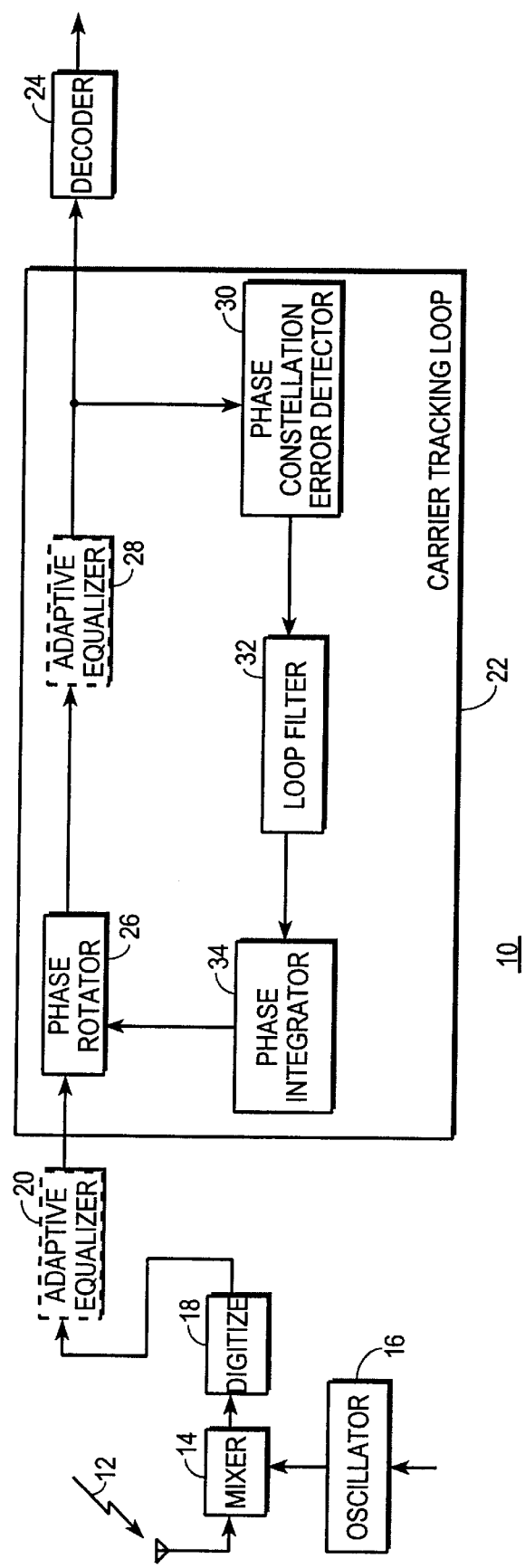
FIG. 1 shows a block diagram of a prior art digital communication receiver.

FIG. 1 shows a block diagram of prior art digital communication receiver 10, discussed above in the Background Of The Invention section.

Figure 2:
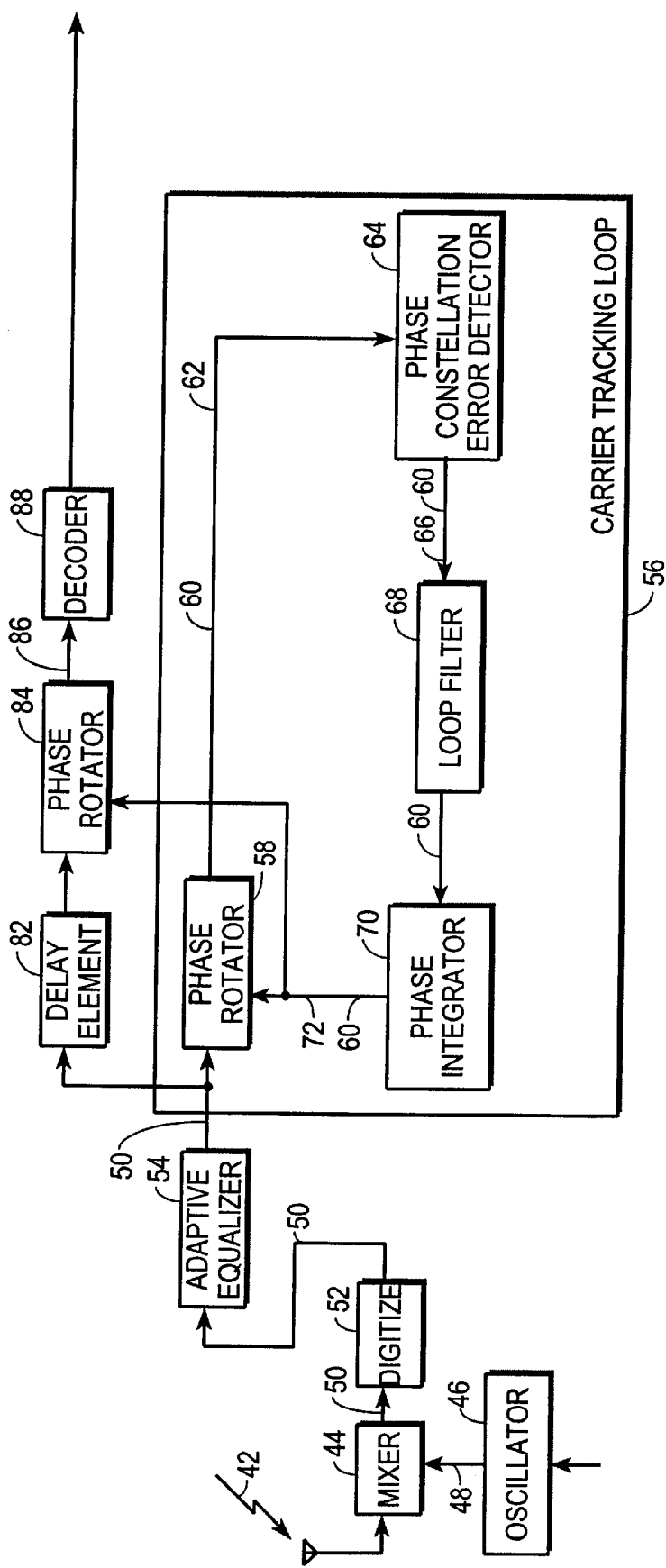
FIG. 2 shows a first embodiment of a phase-noise-compensated digital communication receiver configured in accordance with the teaching of the present invention.

FIG. 2 shows a first embodiment of a phase-noise-compensated digital communication receiver 40 configured in accordance with the teaching of the present invention. In the preferred embodiment, receiver 40 is configured to remain substantially stationary so that the Doppler influences are minimized. However, this is not a requirement of the present invention. In receiver 40, a received digital communication signal 42 is inevitably characterized by some amount of phase noise due to an up-conversion process at a transmitter (not shown) and some amount of additive noise due to thermal noise present in the transmitter and to various types of interference. In the preferred embodiment, received digital communication signal 42 is a radio-frequency (RF) signal, but that is not a requirement of the present invention.

Received signal 42 is amplified in an RF amplifier (not shown) and then down-converted to baseband in a mixer 44. An oscillator 46 provides a local oscillation signal 48 that is mixed with received signal 42 in mixer 44. In the figures, reference numbers pointing to interconnections between block diagram boxes, such as reference number 48, refer to signals, such as local oscillation signal 48, present at such interconnections. In the preferred embodiment, local oscillation signal 48 and signals downstream from mixer 44 are quadrature signals which have two orthogonal signal components.

Moreover, in the preferred embodiment, local oscillation signal 48 may, but is not required to, exhibit a significant amount of phase noise. Local oscillation signal 48 may exhibit this significant amount of phase noise for either or both of two reasons. First, oscillator 46 is desirably an inexpensive oscillator manufactured in accordance with a simple manufacturing process and including few peripheral components to mitigate phase noise. While such an inexpensive oscillator may exhibit a significant amount of phase noise, its use makes receiver 40 suitable for mass market applications. Second, oscillator 46 is desirably a variable frequency oscillation circuit, as indicated in FIG. 2 by a control signal input to oscillator 46. While such a variable frequency oscillator may exhibit a significant amount of phase noise, its use makes receiver 40 suitable for FDM applications.

Due to the phase noise of oscillation signal 48 and of phase noise already present in received signal 42, a down-converted digital communication signal 50 generated at mixer 44 likewise exhibits phase noise. In addition, down-converted digital communication signal 50 exhibits additive noise due to thermal noise in the transmitter of signal 42, interference and transmission noise, and thermal noise in the front end of receiver 40.

Down-converted digital communication signal 50 from mixer 44 passes through a band-pass filter (not shown), a digitizer 52, and an adaptive equalizer 54. Digitizer 52 samples and converts down-converted digital communication signal 50 into a digital signal stream. Adaptive equalizer 54 provides equalization, for example to minimize inter-symbol interference, in accordance with a digital filter having filter coefficients that are adaptively modified to best match the characteristics of the channel through which signals 42 and 50 have passed. Adaptive equalizers are well known to those skilled in the digital communication arts and need not be discussed in detail herein.

Down-converted digital communication signal 50 is passed from adaptive equalizer 54 to a carrier tracking loop 56, which implements a phase locked loop operating in the phase domain. Carrier tracking loop 56 includes a phase rotator 58, preferably configured as a Cordic rotator because of efficient implementation, which has a first input that receives down-converted digital communication signal 50. An output of phase rotator 58 provides a carrier tracking loop signal 60, and more particularly a closed-loop phase signal 62 segment thereof, and couples to an input of a phase constellation error detector 64. An output of phase constellation error detector 64 provides a phase constellation error signal 66 segment of carrier tracking loop signal 60 and couples to an input of a loop filter 68. An output of loop filter 68 provides another segment of carrier tracking loop signal 60 and couples to a control input of a phase integrator 70. An output of phase integrator 70 provides a phase-conveying signal 72 portion of carrier tracking loop signal 60 and couples to a second input of phase rotator 58, where carrier tracking loop signal 60 is fed back upon itself in a manner understood by those skilled in the art.

Figure 3:
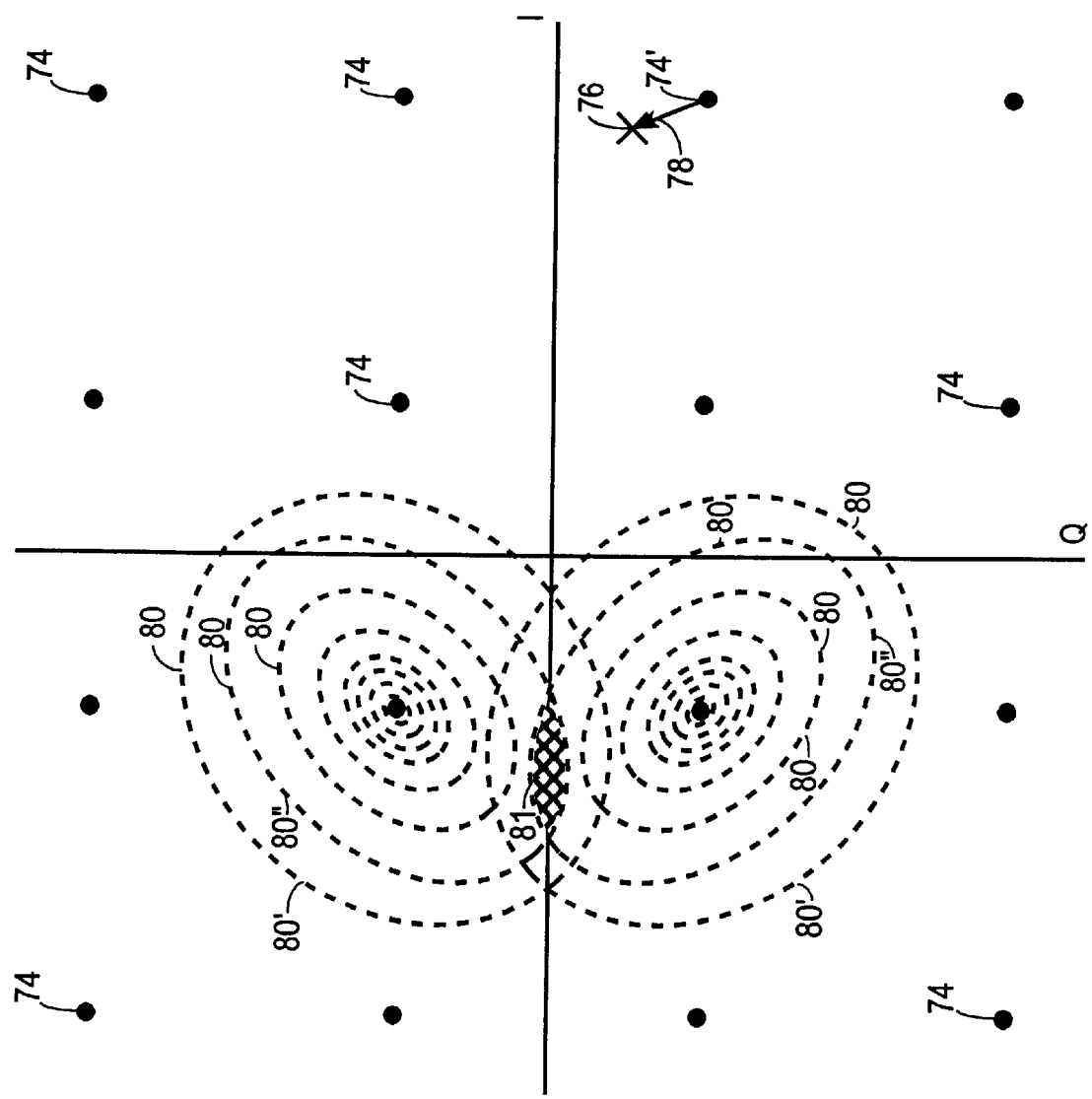
FIG. 3 shows an exemplary phase point constellation diagram.

FIG. 3 shows an exemplary phase point constellation diagram, and in particular FIG. 3 depicts a sixteen-QAM modulation scheme. The sixteen-QAM modulation scheme is illustrated in FIG. 3 for example only; the present invention is not limited to use in connection with sixteen QAM modulation. In fact, the advantages of the present invention become more pronounced as modulation order increases above the modulation order exhibited by the sixteen-QAM modulation scheme.

Referring to FIGS. 2 and 3, during each unit interval, the transmitter (not shown) transmits received digital communication signal 42 so that its quadrature components exhibit the phase relationship depicted by one of sixteen phase points 74 illustrated in FIG. 3. By detecting the phase relationship and amplitude in the received signal, receiver 40 (FIG. 2) can identify the data communicated in each unit interval. For sixteen-QAM, four bits of data are communicated per unit interval, with two bits being communicated through the "I" quadrature component and two bits being communicated through the "Q" quadrature component.

However, phase noise and additive noise continuously work together to corrupt the quadrature phase relationship from the ideal transmitted relationship, and down-converted digital communications signal 50 inevitably exhibits phase relationships and amplitude other than those indicated by phase points 74. For the purpose of illustration, an "X"-labeled phase relationship 76 in FIG. 3 is displaced in phase and amplitude from a closest phase point 74' by a constellation phase error vector 78. Ignoring a decoding function, during each unit interval receiver 40 identifies communicated data by recognizing the phase point 74' closest to received phase relationship 76, in spite of constellation phase error 78. Closed-loop phase signal 62 conveys the communicated data along with error, and phase constellation error signal 66 conveys phase errors 78.

Dotted line ellipses 80 in FIG. 3 roughly indicate isometric error probabilities for an adjacent two of phase points 74. The influence of noise dictates the major and minor diameters of ellipses 80. Generally, additive noise dictates the magnitude of minor diameters and phase noise generally dictates the additional magnitude of the major diameters. A greater probability exists that received phase point relationships depicted in down-converted digital communication signal 50 will fall within inner ellipses 80 than in the region between inner and outer ellipses 80. However, when the influence of noise occasionally causes received phase point relationships to fall near the perimeters of outer ellipses 80 (i.e. large phase constellation errors 78), bit errors are more likely to occur, notwithstanding decoding.

As visually represented by FIG. 3, the error density at outermost ellipses 80' represents the influence of noise in down-converted digital communications signal 50 immediately after digitization in digitizer 52 for a given BER design parameter. In other words, receiver 40 should not make mistakes in identifying communicated data when received phase relationships fall within outer ellipses 80'. Received phase relationships fall outside outer ellipses 80' so seldom that mistakes can happen without exceeding the BER design parameter. However, the overlap in ellipses 80' indicates that many mistakes would occur if data were extracted from digital communications signal 50 immediately after digitization in digitizer 52.

Adaptive equalizer 54 shrinks the error density in a manner known to those skilled in the art to, for example, ellipse 80" primarily by providing equalization that reduces additive noise. However, as visually represented in FIG. 3 at shaded region 81, even ellipses 80" overlap, indicating that an excessive number of errors would occur if data were extracted from closed-loop phase signal 62 within carrier tracking loop 56. Such a situation corresponds to the prior art receiver 10 depicted in FIG. 1 and discussed above when adaptive equalizer 20 rather than adaptive equalizer 28 is included.

Carrier tracking loop 56 alters phase-conveying signal 72 as needed to minimize phase constellation error signal 66 in a manner understood to those skilled in the art. However, noise provides an ultimate floor beneath which phase constellation error signal 66 cannot be minimized during normal operation. Phase constellation error, as conveyed by phase constellation error signal 66, could be further shrunk by narrowing the loop bandwidth of carrier tracking loop 56, primarily through shrinking the bandwidth of loop filter 68. However, in many applications, the loop bandwidth cannot be so narrowed without causing carrier tracking loop 56 to fail to track phase noise. Such applications include communication at higher modulation orders, such as when four or more bits are communicated per unit interval. At higher modulation orders, phase points 74 are positioned closer together, and ellipses 80 of a given size are more likely to overlap.

In phase rotator 58, where carrier tracking loop signal 60 is fed back upon itself, phase-conveying signal 72 exhibits a transport delay relative to the down-converted digital communication signal 50 presented at the first input of phase rotator 58. The transport delay has two components. One component is implementation delay. Implementation delay is imposed on phase-conveying signal 72 through pipelining and other hardware features of implementing phase rotator 58, phase constellation error detector 64, loop filter 68 and phase integrator 70. For a typical carrier tracking loop, 1–40 unit intervals of implementation delay may be inserted in phase-conveying signal 72 relative to down-converted digital communication signal 50.

Another component of delay is group delay. Group delay is imposed on phase-conveying signal 72 primarily through the time-constant, filtering action of loop filter 68. In a typical carrier tracking loop, another 1–40 unit intervals of group delay may be inserted in phase-conveying signal 72 relative to down-converted digital communication signal 50. Accordingly, the carrier tracking loop signal 60 that is fed back upon itself at phase rotator 58 has experienced a transport delay typically in the range of 2–80 unit intervals before being fed back. The present invention exploits this characteristic to reduce the influence of phase noise on down-converted digital communication signal 50.

In particular, a delay element 82 has an input which couples to carrier tracking loop 56 to receive a carrier tracking loop signal, and particularly to receive down-converted digital communications signal 50. Delay element 82 imposes a delay on this carrier tracking loop signal of sufficient duration to compensate for the above-discussed transport delay, which delay is preferably in the range of 2–80 unit intervals. The precise value may be determined empirically, through simulation or by analysis of circuit design. However, delay element 82 need not impose a delay having the precise value which equals the transport delay. Beneficial results are achieved even though the delay imposed by delay element 82 is much less or much greater than the precise transport delay of carrier tracking loop 56, with marginal improvements in performance as the duration of delay converges on a delay value that approximately equals the precise transport delay.

An output of delay element 82 couples to a first input of a phase rotator 84, preferably implemented as a Cordic rotator, which resides outside carrier tracking loop 56. A second input of phase rotator 84 couples to the output of phase integrator 70 so that phase-conveying signal 72 rotates the delayed carrier tracking loop signal generated by delay element 82 as it rotates down-converted digital communications signal 50 in phase rotator 58. Accordingly, phase rotator 84 performs a similar operation to that performed by phase rotator 58, but without experiencing the transport delay that characterizes the rotation provided in phase rotator 58.

The output of phase rotator 84 provides an open-loop phase signal 86 from which digital communication data are extracted. In particular, a decoder 88, for example a convolutional or Viterbi decoder, has an input which couples to the output of phase rotator 84 and receives open-loop phase signal 86. Decoder 88 decodes and extracts data from open-loop phase signal 86 in a manner well understood by those skilled in the art and provides the communicated data at an output thereof.

Figure 4:
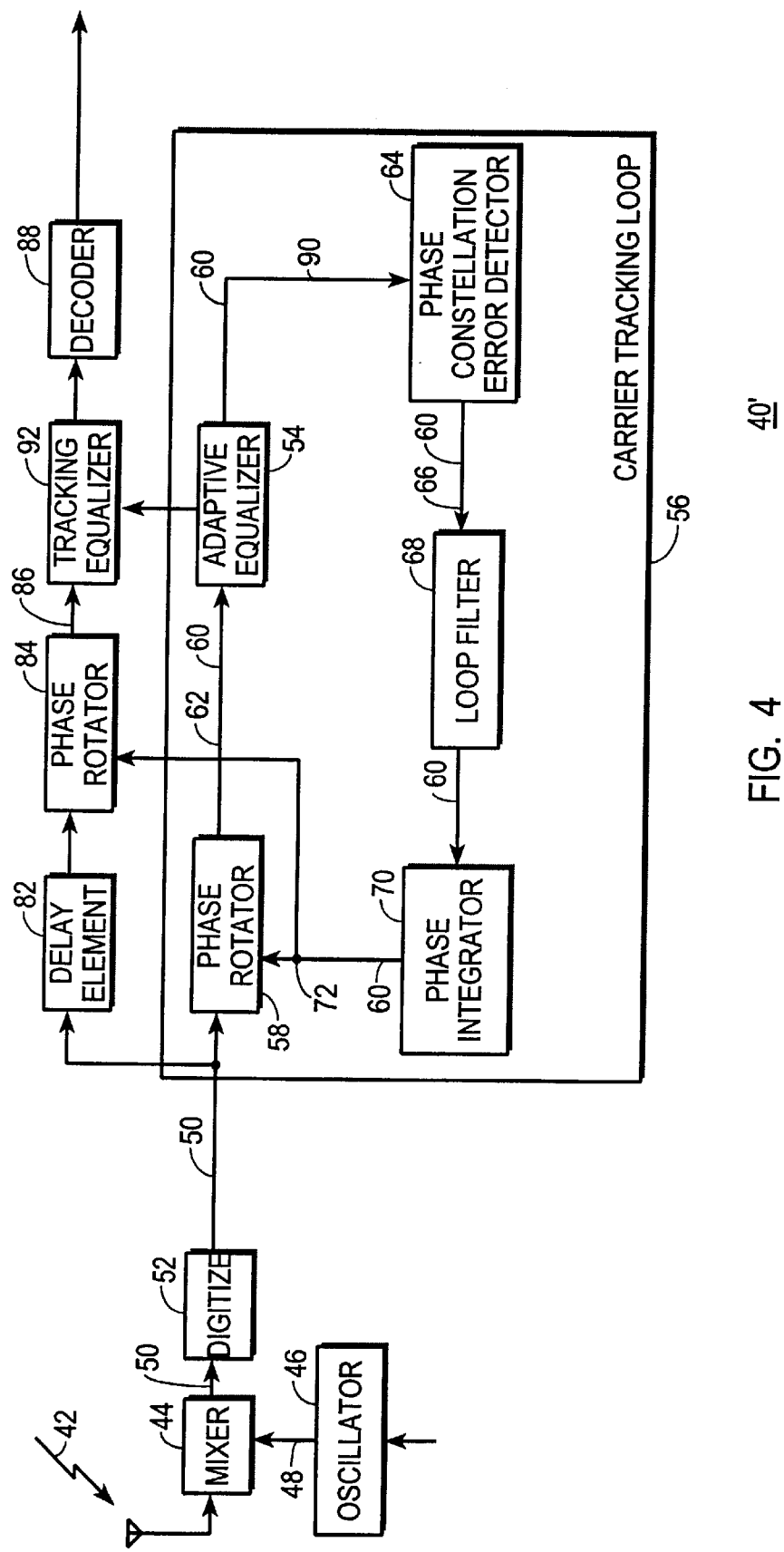
FIG. 4 shows a second embodiment of a phase-noise-compensated digital communication receiver configured in accordance with the teaching of the present invention.

FIG. 4 shows a second embodiment of a phase-noise-compensated digital communication receiver 40' configured in accordance with the teaching of the present invention. The second embodiment of receiver 40' is similar in construction and operation to first embodiment 40, discussed above in connection with FIG. 2. Accordingly, the above-presented discussion applies to receiver 40', with the following exceptions.

In receiver 40', adaptive equalizer 54 is moved into carrier tracking loop 56 from its position upstream of carrier tracking loop 56 in receiver 40 (FIG. 2). In particular, adaptive equalizer 54 has an input coupled to the output of phase rotator 58 and an output coupled to the input of phase constellation error detector 64. Thus, instead of closed-loop phase signal 62 driving phase constellation error detector 64, an equalized phase point data stream signal 90 segment of carrier tracking loop signal 60 is output from adaptive equalizer 54 and drives phase constellation error detector 64.

By moving adaptive equalizer 54 into carrier tracking loop 56, adaptive equalizer 54 better equalizes the received signal and better compensates for the effects of additive noise. However, the inclusion of adaptive equalizer 54 within carrier tracking loop 56 most probably increases the transport delay of carrier tracking loop 56, and this increase is desirably reflected in the delay implemented in delay element 82.

Moreover, a tracking equalizer 92 is added outside carrier tracking loop 56 to compensate for the in-loop adaptive equalizer 54. In particular, tracking equalizer 92 has an input coupled to the output of phase rotator 84 and an output coupled to the input of decoder 88 so that open-loop phase signal 86 now drives tracking equalizer 92.

Tracking equalizer 92 desirably has a filter structure identical to that of adaptive equalizer 54 (i.e. the same number and configuration of taps), but omits adaptation circuitry. Rather than include adaptation circuitry, tracking equalizer 92 couples to and obtains its filter coefficients from adaptive equalizer 54. As the values for filter coefficients in adaptive equalizer 54 are adaptively instantiated as needed from time to time in response to data detected within carrier tracking loop 56, those same coefficient values are applied as the corresponding filter coefficients for tracking equalizer 92. Accordingly, tracking equalizer 92 provides equalization to open-loop phase signal 86 in the same manner as adaptive equalizer 54 provides equalization for closed-loop phase signal 62.

Receiver 40' exhibits improved performance over receiver 40, but does so at the cost of an additional equalizer. Equalizers are complex components. As an example, a phase rotator implemented using the Cordic architecture is not a simple component and may require approximately 50,000 gates for implementation in an ASIC, while an equalizer may require approximately 135,000 gates. Thus, the inclusion of an additional equalizer may be unduly burdensome in some applications.

Figure 5:
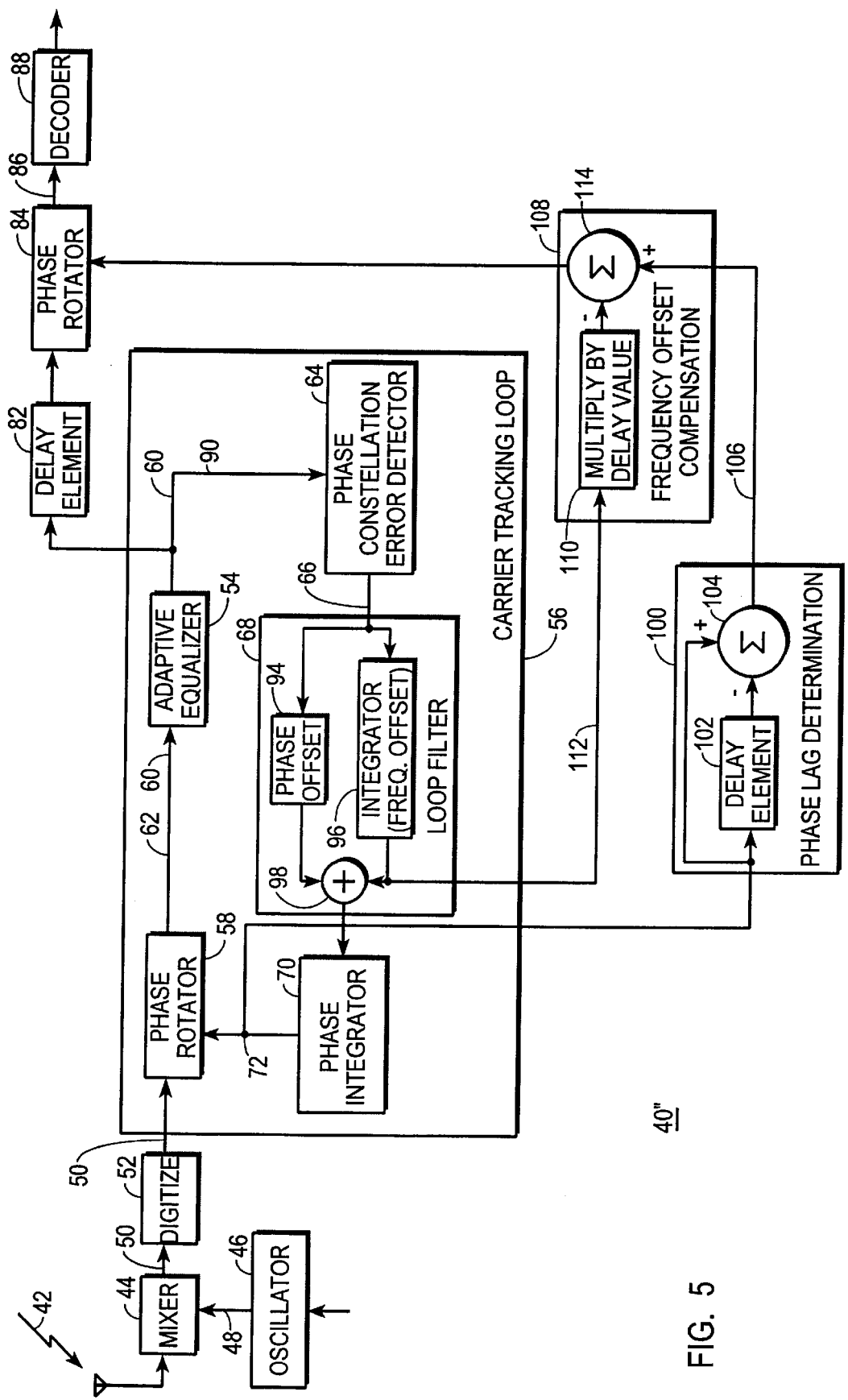
FIG. 5 shows a third embodiment of a phase-noise-compensated digital communication receiver configured in accordance with the teaching of the present invention.

FIG. 5 shows a third embodiment of a phase-noise-compensated digital communication receiver 40" configured in accordance with the teaching of the present invention. The third embodiment of receiver 40" is similar in construction and operation to first and second embodiments 40 and 40", discussed above in connection with FIGS. 2 and 4, respectively. Accordingly, the above-presented discussions of receivers 40 and 40' apply to receiver 40", with the following exceptions.

Receiver 40" omits tracking equalizer 92 of receiver 40' (FIG. 4). Accordingly, open-loop phase signal 86 drives decoder 88, as in receiver 40 (FIG. 2). In receiver 40" the input of delay element 82 couples to the output of adaptive equalizer 54. Thus, equalized phase point data stream signal 90 serves as the carrier tracking loop signal that drives delay element 82 and is delayed therein before rotation in phase rotator 84.

FIG. 5 expands details of loop filter 68 to reveal a preferred second order loop-filter structure. In particular, the input of loop filter 68 is received at a phase offset section 94 and at an integrator 96, which determines frequency offsets. Outputs from phase offset section 94 and integrator 96 are combined in a combining circuit 98, and the output of combining circuit 98 serves as the output from loop filter 68.

Referring to receivers 40 (FIG. 2) and 40' (FIG. 4), phase rotator 58 and phase rotator 84 perform independent, parallel rotations on the same down-converted digital communication signal 50 values. These independent parallel rotations are of different phase values. These different phase values are conveyed by phase-conveying signal 72 at points in time that are separated by the delay imposed by delay element 82. By comparison, receiver 40" (FIG. 5) accomplishes an equivalent function by performing two serial rotations. The first rotation occurs in phase rotator 58, and the second rotation occurs in phase rotator 84. The second rotation rotates the delayed carrier tracking loop signal by the difference between the above-discussed phase values.

In particular, a phase lag determination circuit 100 identifies this difference between the phases conveyed by phase-conveying signal 72 at points in time separated by the duration implemented in delay element 82. Phase lag determination circuit 100 includes a delay circuit 102 that has an input coupled to the output of phase integrator 70 and that receives phase-conveying signal 72. The duration of the delay imposed by delay circuit 102 is preferably equal to the duration of delay imposed by delay element 82. However, any delay within this duration ±50% can still achieve a beneficial result. An output of delay element 102 couples to a negative input of a subtraction circuit 104. A positive input of subtraction circuit 104 also couples to the output of phase integrator 70 to receive phase-conveying signal 72. The output of subtraction circuit 104 serves as the output of phase lag determination circuit 100 and provides a phase difference signal 106.

However, phase difference signal 106 is characterized by a constant phase offset value, to the extent that a frequency offset is present in carrier tracking loop signal 60, plus a noise value. This frequency offset "constant" portion of phase difference signal 106 is not phase-noise related and is removed by a frequency offset compensation circuit 108.

Frequency offset compensation circuit 108 includes a multiplier 110 having an input coupled to the output of integrator 96 from loop filter 68 to receive a frequency offset signal 112. Multiplier 110 is configured to multiply the frequency offset conveyed by frequency offset signal 112 by a constant value representing the duration of delay imposed by delay elements 82 or 102. The result of this multiplication operation is a phase value that substantially equals the frequency offset constant portion of the phase difference signal. The output of multiplier 110 couples to a negative input of a subtraction circuit 114, and the output of phase lag determination circuit 100 couples to a positive input of subtraction circuit 114. The output of subtraction circuit 114 serves as the output of frequency offset compensation circuit 108 and couples to the second input of phase rotator 84.

In summary, the present invention provides an improved phase-noise compensated digital communication receiver and method. The influence of phase noise is mitigated somewhat independently of the loop bandwidth characteristic of a carrier tracking loop by decoding an open-loop phase signal which is compensated for transport delay encountered in the carrier tracking loop. As a result of the present invention, a digital communication receiver can operate at higher modulation orders, such as four or more bits per unit interval, while tolerating a significant amount of phase noise.

Although the preferred embodiments of the present invention have been illustrated and described in detail, it will be readily apparent to those skilled in the art that various modifications and equivalents may be made therein without departing from the spirit of the invention or from the scope of the appended claims.

What is claimed is:

1. A phase-noise-compensated receiver for digital communication comprising:

a carrier tracking loop having an input which receives a down-converted digital communication signal, having a first phase rotator with a first input adapted to receive said down-converted digital communication signal, having a first equalizer with an input coupled to an output of said first phase rotator and with first coefficients adaptively instantiated with values determined in response to received data, having a phase constellation error detector with an input coupled to an output of said first equalizer, having a loop filter with an input coupled to an output of said phase constellation error detector, having a phase integrator with an input coupled to an output of said loop filter and with an output coupled to a second input of said first phase rotator, said phase integrator output providing a phase-conveying signal;

a delay element having an input coupled to said carrier tracking loop to receive said down-converted digital communication signal and having an output;

a second phase rotator residing outside said carrier tracking loop, said second phase rotator having a first input coupled to said delay element output, a second input coupled to said phase integrator and having an output that provides a signal from which digital communication data are extracted; and a second equalizer having an first input coupled to said second phase rotator output and a second input coupled to said first equalizer so that said second equalizer provides equalization determined by second coefficients which track said first coefficients.

2. A phase-noise-compensated receiver for digital communication comprising:

a carrier tracking loop having an input which receives a down-converted digital communication signal and having a phase integrator which generates a phase-conveying signal;

a delay element having an input coupled to said carrier tracking loop and having an output;

a phase rotator residing outside said carrier tracking loop, having a first input coupled to said delay element output, having a second input coupled to said phase integrator and having an output that provides a signal from which digital communication data are extracted; and an equalizer having an input coupled to said phase rotator output.

3. A receiver as claimed in claim 2 wherein said delay element input couples to said carrier tracking loop to receive said down-converted digital communication signal.

4. A receiver as claimed in claim 2 wherein:

said equalizer is a first equalizer which provides equalization determined in response to a first set of filter coefficients; and said carrier tracking loop includes a second equalizer having a second set of filter coefficients adaptively instantiated with values determined in response to data detected within said carrier tracking loop, said second equalizer being coupled to said first equalizer so that said first coefficients track said second coefficients.

5. A receiver as claimed in claim 2 wherein said phase rotator is a first phase rotator and said carrier tracking loop comprises:

a second phase rotator having a first input adapted to receive said down-converted digital communication signal, a second input and an output;

a phase constellation error detector having an input coupled to said output of said second phase rotator and having an output;

a loop filter having an input coupled to said phase constellation error detector output and having an output; and said phase integrator having an input coupled to said loop filter output and having an output coupled to said second input of said second phase rotator, said phase integrator output providing said phase-conveying signal.

6. A receiver as claimed in claim 5 wherein:

said delay element input couples to said carrier tracking loop to receive said down-converted digital communication signal;

said equalizer is a first equalizer configured to provide equalization determined by first coefficients; and said carrier tracking loop additionally comprises a second equalizer coupled between said second phase rotator and said phase constellation error detector, said second equalizer having second coefficients adaptively instantiated with values determined in response to received data, and said second equalizer being coupled to said first equalizer so that said first coefficients track said second coefficients.

7. A receiver as claimed in claim 2 wherein said delay element provides a delay in the range of 2–80 unit intervals.

8. A receiver as claimed in claim 2 wherein said carrier tracking loop includes a phase constellation error detector which detects phase constellation errors in accordance with a modulation order wherein data are communicated at greater than or equal to four bits per unit interval.

9. A receiver as claimed in claim 2 wherein:

said carrier tracking loop is configured so that said phase-conveying signal experiences a group delay plus an implementation delay relative to said down-converted digital communication signal; and said delay element provides a delay sufficient to substantially compensate for said group delay plus said implementation delay.

10. A receiver as claimed in claim 2 wherein said receiver additionally comprises:

a variable frequency oscillation circuit configured to generate an oscillation signal which exhibits an amount of phase noise; and a mixer adapted to receive a communication signal and said oscillation signal, said mixer being coupled to said carrier tracking loop in order to supply said down-converted digital communication signal.

11. A receiver as claimed in claim 2 additionally comprising a decoder having an input coupled to said phase rotator output.

12. A method of compensating for phase noise in a digital communication receiver comprising the steps of:

altering a phase-conveying signal generated by a phase integrator in a carrier tracking loop, said phase-conveying signal being altered to minimize a phase-constellation error signal generated in said carrier tracking loop;

obtaining a down-converted digital communication signal from said carrier tracking loop;

delaying said down-converted digital communication signal to generate a delayed carrier tracking loop signal, said delayed carrier tracking loop signal being external to said carrier tracking loop;

rotating said delayed carrier tracking loop signal in response to said phase-conveying signal to generate an open-loop phase signal;

equalizing said open-loop phase signal to generate an equalized open-loop phase signal; and extracting communicated data from said equalized open-loop phase signal.

13. A method as claimed in claim 12 wherein:

said equalizing step is a first equalizing step;

said first equalizing step provides equalization determined in response to a first set of filter coefficients;

said altering step comprises a second equalizing step which causes said phase-conveying signal to be altered in response to a second set of filter coefficients that are adaptively instantiated with values determined in response to data detected in said carrier tracking loop; and said first set of filter coefficients track said second set of filter coefficients.

14. A method as claimed in claim 12 wherein said delaying step delays said signal extracted from said carrier tracking loop by a duration in the range of 2–80 unit intervals.

15. A method as claimed in claim 12 wherein said phase-constellation error signal is determined in accordance with a modulation order wherein data are communicated at greater than or equal to four bits per unit interval.

16. A method as claimed in claim 12 additionally comprising the steps of:

generating an oscillation signal which exhibits an amount of phase noise; and down-converting a received signal in response to said oscillation signal to generate said down-converted digital communication signal, wherein said down-converted digital communication signal is influenced by said amount of phase noise.

17. A method as claimed in claim 12 wherein said extracting step comprises the step of decoding said equalized open-loop phase signal.

\* \* \* \* \*